United States Patent
Leone et al.

(10) Patent No.: US 10,520,305 B2
(45) Date of Patent: Dec. 31, 2019

(54) DETERMINING VEHICLE WHEEL MISALIGNMENT

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, PLC, Dearborn, MI (US)

( * ) Notice: Subject to any disclaimer, the term of this patent is extended or adjusted under 35 U.S.C. 154(b) by 197 days.

(21) Appl. No.: 15/685,969

(22) Filed: Aug. 24, 2017

(65) Prior Publication Data

US 2019/0063913 A1 Feb. 28, 2019

(51) Int. Cl.

| G01B 21/26 | (2006.01) |
|---|---|
| G01M 17/06 | (2006.01) |
| G01M 1/16 | (2006.01) |
| G01M 1/28 | (2006.01) |
| G01M 1/22 | (2006.01) |
| B60C 23/06 | (2006.01) |
| B60W 50/02 | (2012.01) |

(52) U.S. Cl.
CPC ........... *G01B 21/26* (2013.01); *G01M 1/225* (2013.01); *G01M 1/28* (2013.01); *B60C 23/061* (2013.01); *B60W 2050/0215* (2013.01); *B60W 2520/28* (2013.01); *G01B 2210/30* (2013.01)

(58) Field of Classification Search
CPC .............. G01B 21/26; G01B 2210/26; G01B 2210/30; G01M 1/16; G01M 1/225; G01M 1/28; G01M 17/06; B60C 23/061; B60W 2050/0215; B60W 2520/28

USPC ......................................................... 701/29.2
See application file for complete search history.

(56) References Cited

U.S. PATENT DOCUMENTS

| 6,759,952 | B2 | 7/2004 | Dunbridge et al. |
|---|---|---|---|
| 7,698,031 | B2 | 4/2010 | Stevenson |
| 7,813,850 | B2 | 10/2010 | Mannerfelt |
| 8,047,061 | B2 | 11/2011 | Shin et al. |
| 8,706,347 | B2 | 4/2014 | Bae et al. |
| 9,168,924 | B2 | 10/2015 | Lee et al. |
| 9,238,407 | B1 * | 1/2016 | Brito ................ B60W 30/14 |
| 9,466,157 | B2 | 10/2016 | Kourtev et al. |
| 9,552,679 | B2 | 1/2017 | Rutkowski et al. |

(Continued)

FOREIGN PATENT DOCUMENTS

| DE | 102008064261 A1 | 9/2009 |
|---|---|---|
| DE | 102012219762 A1 | 4/2014 |

(Continued)

OTHER PUBLICATIONS

Article entitled, "What a Future!, Google Driverless Car Can Diagnose itself on Its Own" 5 Pages, Aug. 2014; Vinay Nagaraju.

*Primary Examiner* — Marthe Y Marc-Coleman
(74) *Attorney, Agent, or Firm* — Frank A. MacKenzie; Bejin Bieneman PLC

(57) ABSTRACT

A computer and a method executable by the computer. The computer may include a processor and memory storing instructions executable by the processor. The instructions may include, to: receive sensor data from a sensor in a vehicle operating in a fully autonomous mode; using the data, determine a misalignment value; and based on the value, perform one of a plurality of vehicle driving functions that include stopping the vehicle.

15 Claims, 7 Drawing Sheets

(56) References Cited

U.S. PATENT DOCUMENTS

| | | |
|---|---|---|
| 9,822,314 B2 * | 11/2017 | Ray .................... C10G 3/50 |
| 2009/0139327 A1 | 6/2009 | Dagh et al. |
| 2010/0211249 A1 | 8/2010 | McClellan |
| 2012/0008148 A1 * | 1/2012 | Pryce ............... G01B 11/245 |
| | | 356/601 |
| 2012/0083960 A1 * | 4/2012 | Zhu .................. G01S 17/936 |
| | | 701/23 |
| 2013/0035827 A1 * | 2/2013 | Breed ............... B60R 21/0132 |
| | | 701/45 |
| 2015/0276923 A1 * | 10/2015 | Song ................. G01S 7/4004 |
| | | 702/97 |
| 2017/0023444 A1 | 1/2017 | Krueger et al. |
| 2017/0076514 A1 | 3/2017 | Valeri et al. |
| 2017/0103268 A1 | 4/2017 | Santamaria et al. |
| 2018/0023951 A1 * | 1/2018 | Seo .................. G01B 11/275 |
| | | 356/138 |

FOREIGN PATENT DOCUMENTS

| | | | | |
|---|---|---|---|---|
| EP | 1427165 A2 * | 6/2004 | ............ | G07C 5/008 |
| FR | 3041432 A1 | 3/2017 | | |
| KR | 20130064344 A | 6/2013 | | |
| KR | 20140049855 A | 4/2014 | | |
| WO | 2016142082 A1 | 9/2016 | | |

* cited by examiner

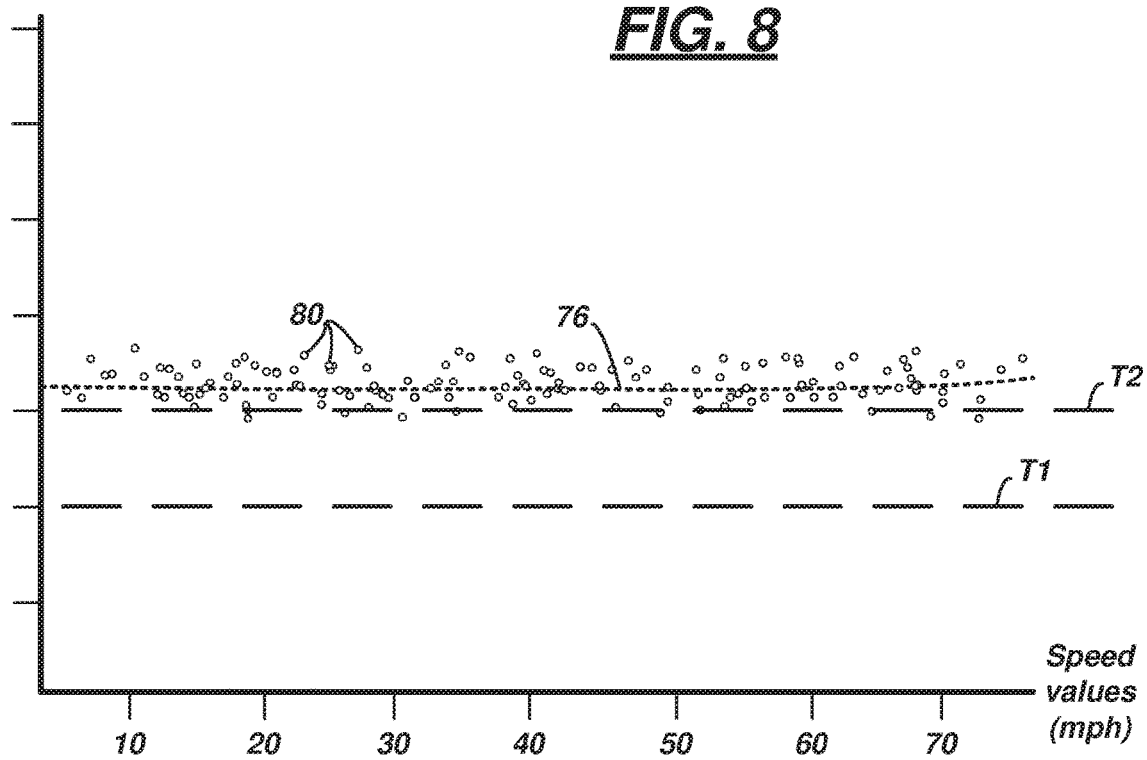

DETERMINING VEHICLE WHEEL MISALIGNMENT

BACKGROUND

Vehicle wheel misalignment can result in abnormal or excessive tire wear. This may require an owner of the vehicle to replace vehicle tires before a prescribed tire life.

BRIEF DESCRIPTION OF THE DRAWINGS

FIGS. 6-8 are graphical depictions of error values and speed values associated with the vehicle of FIG. 1.

DETAILED DESCRIPTION

Figure 1:
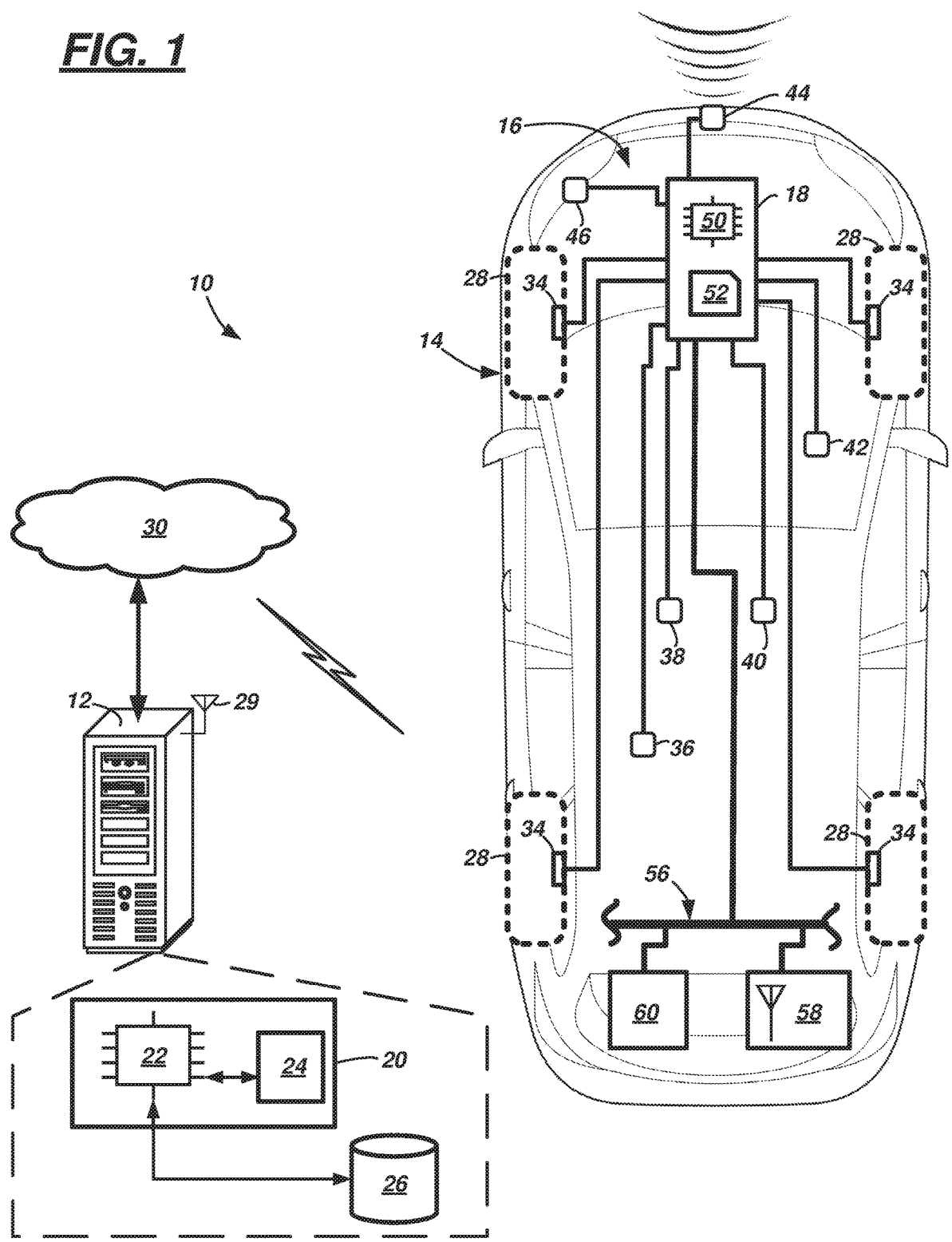
FIG. 1 is schematic diagram of a wheel misalignment sensing system that includes a vehicle operable in a fully autonomous mode and an onboard computer.

A vehicle wheel misalignment sensing system is described that includes a computer in an autonomous vehicle. In some examples, the system further comprises a backend server. According to one illustrative example, the computer includes a processor and memory storing instructions executable by the processor. The instructions may include, to: receive sensor data from a sensor in a vehicle operating in a fully autonomous mode; using the data, determine a misalignment value; and based on the value, perform one of a plurality of vehicle driving functions that include stopping the vehicle.

According to the at least one example set forth above, the plurality further comprises slowing the vehicle according to a maximum speed threshold.

According to the at least one example set forth above, the instructions further comprise: to slow the vehicle based on a first misalignment value, and to stop the vehicle based on a second, larger misalignment value.

According to the at least one example set forth above, the instructions further comprise: to perform a different one of the plurality based on a third misalignment value that is less than the first misalignment value.

According to the at least one example set forth above, the speed threshold is based on a calculated trend-line based on wheel misalignment error values and corresponding vehicle speed values.

According to the at least one example set forth above, the trend-line is based on wheel misalignment error values and corresponding speed values which are both larger and smaller than a misalignment error threshold.

According to the at least one example set forth above, the misalignment error threshold is larger than three standard deviations of a mean error.

According to the at least one example set forth above, the plurality further comprises providing a notification to a user of the vehicle.

According to the at least one example set forth above, the plurality further comprises sending a notification to a vehicle manufacturer or dealership.

According to the at least one example set forth above, the plurality further comprises driving the vehicle in the mode to a vehicle service station.

According to the at least one example set forth above, the plurality further comprises determining to maintain the current direction and/or rotational movement of the vehicle wheels in the mode.

According to the at least one example set forth above, the instructions further comprising, prior to receiving data, to determine whether a signal carrying the data is currently available.

A system according to the at least one example set forth above, comprising: the afore-mentioned computer; and a server programmed to at least partially determine the misalignment value.

According to another illustrative example, a method is described which may be executed at least partially by the computer. The method may include: receiving sensor data from a sensor in a vehicle operating in a fully autonomous mode; using the data, determining a misalignment value; and based on the value, performing one of a plurality of vehicle driving functions, wherein one of the plurality is to stop the vehicle.

According to the at least one example set forth above, another one of the plurality is to slow the vehicle according to a maximum speed threshold.

According to the at least one example set forth above, further comprising: slowing the vehicle based on a first misalignment value, or stopping the vehicle based on a second, larger misalignment value.

According to the at least one example set forth above, further comprising: performing a different one of the plurality based on a third misalignment value that is less than the first misalignment value.

According to the at least one example set forth above, the speed threshold is based on a calculated trend-line that comprises wheel misalignment error values and corresponding vehicle speed values.

According to the at least one example set forth above, the calculated trend-line is based on wheel misalignment error values and corresponding speed values which are both larger and smaller than a misalignment error threshold.

According to the at least one example set forth above, the plurality further comprises: to provide a notification to a user of the vehicle, to send a notification to a vehicle manufacturer or dealership, to drive the vehicle in the mode to a vehicle service station, or to determine to maintain the current direction and/or rotational movement of the vehicle wheels in the mode.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a vehicle wheel misalignment sensing system 10 that may include a backend server 12 and an autonomous vehicle 14 comprising an onboard sensing system 16 that includes a computer 18 that is programmed to: receive as input: acceleration data, steering angle and/or torque data, other wheel alignment data, or a combination thereof; calculate indicia of wheel misalignment by comparing the data to one or more thresholds; and when calculated values exceed the threshold(s), determining whether to issue a notification to a user (not shown) of the vehicle 14 or to regulate a new speed of the vehicle 14 (or even stop the vehicle) until an authorized service technician has serviced it. The system 16 may be particularly suitable for autonomous vehicles. For example, trained drivers or service technicians may be capable of diagnosing wheel misalignment concerns by touch or feel during a test drive—e.g., based on the vehicle's reaction to road conditions such as bumps in the roadway, response to driver steering inputs, etc. However, autonomous vehicles such as vehicle 14—which are driven by computer 18 and which do not have a human driver—may be unable to drive by such human-feel. The present disclosure not only diagnoses wheel misalignment, but also is capable of determining a severity and taking an appropriate vehicle action.

In at least one example, vehicle wheel misalignment sensing system 10 may comprise backend server 12 which can be used to perform misalignment calculations and/or severity determinations; however, server 12 is not required in all examples. Server 12 may comprise one or more computing devices 20 which may be interconnected via a wired or wireless interface (e.g., one computing device 20 is shown for illustrative purposes). The computing device 20 may be programmed to: receive wheel alignment data from each of a plurality of vehicles (such as vehicle 14); for each of the plurality of vehicles, determine whether an error is present (e.g., indicating one or more vehicle wheel misalignments) based on the alignment data; and output to each of the plurality of vehicles, a severity or misalignment value associated with a wheel misalignment at the respective vehicle. For example, computing device(s) 20 may perform these calculations to expedite computer processing time and/or to conserve computer processing resources at the vehicle 14. As will be explained more below, when the server 12 provides a severity value to vehicle 14, computer 18 onboard vehicle 14 may take appropriate corrective action.

Computing device 20 may comprise one or more processors 22 coupled to memory 24. For example, processor 22 can be any type of device capable of processing electronic instructions, non-limiting examples including a microprocessor, a microcontroller or controller, an application specific integrated circuit (ASIC), etc.—just to name a few. In general, processor(s) 22 may be programmed to execute digitally-stored instructions, which may be stored in memory 24, which enable the computing device 20, among other things, to determine whether errors in wheel alignment data and severity values associated with the determined errors.

Memory 24 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 24 may store one or more computer program products which may be embodied as software, firmware, or the like.

According to at least one example, server 12 may comprise one or more databases 26 as well—e.g., coupled to processor(s) 22. Database(s) 26 may store one more vehicle data records in a centralized repository. Data records may store information pertaining to the particular vehicle 14, user of the vehicle 14, etc. A non-limiting example of a data record may include a data array that comprises: a year of manufacture of vehicle 14, a make of vehicle 14, a model of vehicle 14, a vehicle identification number (VIN) of vehicle 14, one or more features and accessories of vehicle 14 (e.g., manufacturer package, extras, etc.), environmental data relative to the vehicle 14 (e.g., state or city of the user), driving habits of the user(s) of vehicle 14, diagnostic data of the vehicle 14, tire pressure data at each tire of wheels 28 of vehicle 14, authorized service data, and the like. Server 12 may utilize computing devices 20 to aggregate this data and determine patterns which may assist a manufacturer in addressing service issues before they arise. Furthermore, at least some of this data may be used by server 12 in determining wheel alignment data and severity values.

Server 12 may have a wireless transceiver 29 or be coupled to such a transceiver, enabling server 12 to be in communication with vehicle 14 (and other similar vehicles) via a wired and/or wireless communication network 30, which communication network may comprise a land communication network, a wireless communication network, or a combination thereof, as will be appreciated by those skilled in the art. For example, a land communication network can enable connectivity to public switched telephone network (PSTN) such as that used to provide hard-wired telephony, packet-switched data communications, internet infrastructure, and the like. And a wireless communication network may include satellite communication architecture and/or may include cellular telephone communication over wide geographic region(s). Thus, in at least one example, network 30 includes any suitable cellular infrastructure that could include eNodeBs, serving gateways, base station transceivers, and the like. Further, network 30 may utilize any suitable existing or future cellular technology (e.g., including LTE, CDMA, GSM, etc.).

Figure 2:
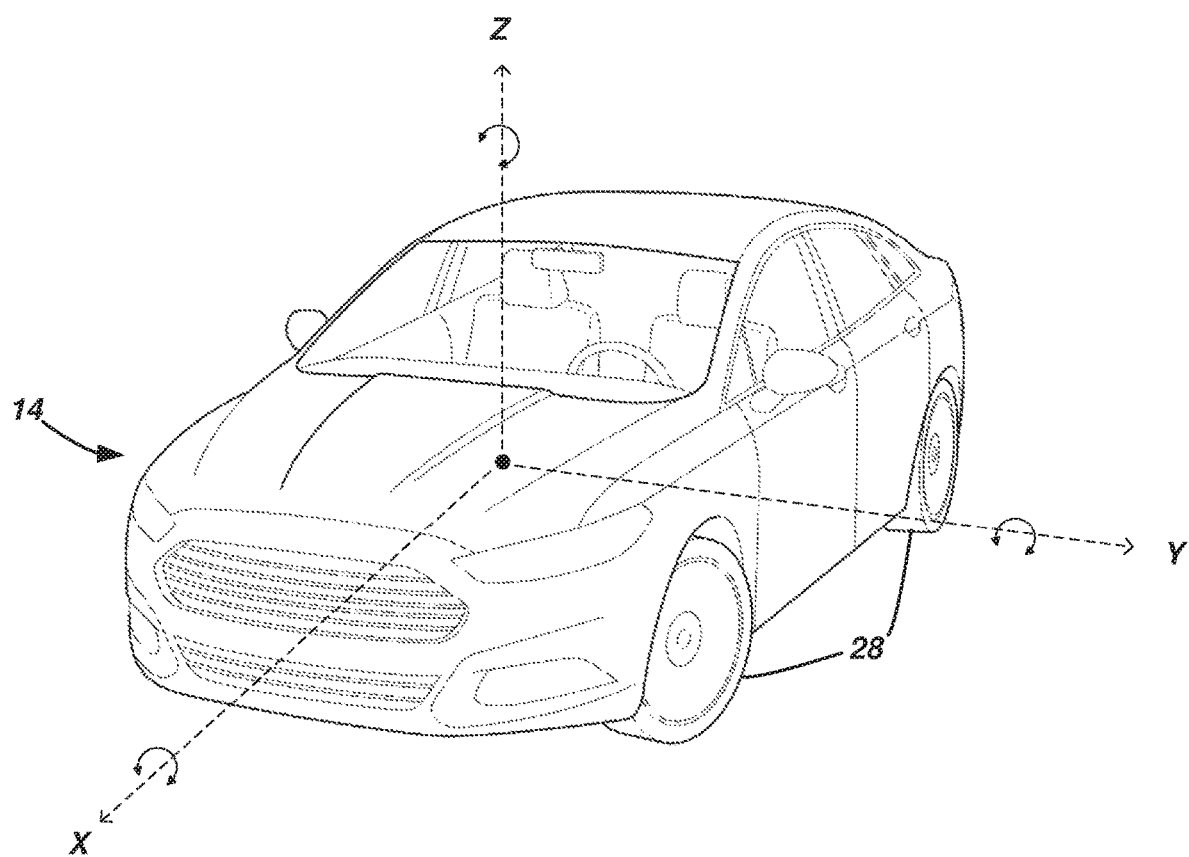
FIG. 2 a perspective view of the vehicle of FIG. 1.

Turning now to the vehicle shown in FIGS. 1-2, vehicle 14 is shown as a passenger car; however, vehicle 14 could also be a truck, sports utility vehicle (SUV), recreational vehicle, bus, or the like that includes the onboard sensing system 16. Vehicle 14 may be operated in any one of a number of autonomous modes. In at least one example, vehicle 14 may operate as an autonomous taxi or the like—e.g., operating in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 14. For example, at level 0 ("no automation"), a human driver is responsible for all vehicle operations. At level 1 ("driver assistance"), the vehicle 14 sometimes assists with steering, acceleration, or braking, but the driver is still responsible for the vast majority of the vehicle control. At level 2 ("partial automation"), the vehicle 14 can control steering, acceleration, and braking under certain circumstances without human interaction. At levels 3-5, the vehicle 14 assumes more driving-related tasks. At level 3 ("conditional automation"), the vehicle 14 can handle steering, acceleration, and braking under certain circumstances, as well as monitoring of the driving environment. Level 3 may require the driver to intervene occasionally, however. At level 4 ("high automation"), the vehicle 14 can handle the same tasks as at level 3 but without relying on the driver to intervene in certain driving modes. As used herein, a fully autonomous vehicle such as vehicle 14 is one operable at level 5 ("full automation" or in a "fully autonomous mode"), wherein the vehicle 14 (or more particularly, one or more onboard fully autonomous computers) can handle all driving tasks without any driver intervention. And it is in a fully autonomous mode that the present disclosure may assist users (e.g., such as a driver, passenger, or maintenance personnel) with information regarding wheel misalignment—e.g., as such a user does not touch or feel wheel misalignment in conventional manners.

Onboard sensing system 16 may be configured to provide wheel alignment data to the computer 18 so that computer 18 may determine whether to execute or perform one or more vehicle driving functions. Sensing system 16 may comprise the computer 18 and a variety of sensors which may provide wheel alignment data to the computer. Non-limiting examples of these sensors include: one or more wheel speed sensors 34, one or more steering angle and/or torque sensors 36, one or more acceleration sensors 38 (e.g., x-, y-, and/or z-axis sensors—e.g., according to the X-, Y-, and Z-axes of vehicle 14, as exemplified in FIG. 2), one or more vehicle rotational-rate sensors 40 (e.g., roll, yaw, and/or pitch sensors), one or more suspension sensors 42, an imaging sensors 44, position or location sensors 46, or a combination thereof.

Some aspects of computer 18 may be similar to the computing device 20 of server 12. For instance, according to one example, computer 18 is programmed to make at least some of the same wheel misalignment determinations as server 12, including calculating or otherwise determining a misalignment value. According to another example, computer 18 is programmed to upload sensor data to the server 12, permit the server 12 to make wheel misalignment determinations, and then receive in return a misalignment value which may trigger the computer 18 to execute one or more vehicle driving functions.

Computer 18 may be a single computer (or multiple computing devices—e.g., shared with other vehicle systems and/or subsystems). In at least one example, computer 18 is or is part of an anti-lock braking system (ABS) module, roll stability control (RSC) module, an electronic stability control (ESC) module, a combination thereof, or the like. However, it should be appreciated that these are merely examples; e.g., in other instances, computer 18 may be a dedicated system apart from these or other existing vehicles computers. Computer 18 may comprise a processor 50 coupled to memory 52. For example, processor 50 can be any type of device capable of processing electronic instructions, non-limiting examples including a microprocessor, a microcontroller or controller, an application specific integrated circuit (ASIC), etc.—just to name a few. In general, computer 18 may be programmed to execute digitally-stored instructions, which may be stored in memory 52, which enable the computer 18, among other things, to perform at least some of the same tasks as server 12, as well determining whether sensor data is available (e.g., the sensor may be primarily used in other applications and sensor data may not be immediately available to computer 18); and to determine which of a plurality of vehicle driving functions to execute in response to determining wheel misalignment greater than a predetermined threshold (e.g., which threshold may be stored in memory 52).

Memory 52 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 52 may store one or more computer program products which may be embodied as software, firmware, or the like.

Vehicle 14 may comprise one or wheel speed sensors 34; e.g., in the illustrations, each wheel comprises a sensor; however, this is not required. The wheel speed sensor 34 may measure and/or calculate angular wheel speed at the respective wheel 28.

Steering angle and/or torque sensors 36 may form part of a vehicle steering system (not shown) and may measure and/or calculate a steering input to one or more wheels 28. For example, some vehicles 14 may have a steering wheel permitting a driver to steer the vehicle, even though the vehicle 14 also may be operated in a fully autonomous mode. Steering angle sensors 36 may measure movement and/or input of a mechanical linkage and/or steering input in drive-by-wire systems. Other fully autonomous vehicles 14 may not have a steering wheel or steering column, and in these or similar instances, steering angle and/or torque sensors 36 may measure a steering mechanical movement of and/or electronic steering input to the chassis (e.g., input from a computer or module of the steering system).

Acceleration sensors 38 (e.g., x-, y-, and z-axis sensors) may be any suitable sensor for detecting an acceleration in the X-, Y-, and/or Z-axis. For example, sensor 38 may be a single tri-axis accelerometer positioned and oriented in the vehicle 14 in order to measure accelerations in the X-, Y-, and Z-axes. In other examples, a separate accelerometer may be used for each of the X-, Y-, and/or Z-axes. Sensor(s) 38 may be part of the anti-lock braking system (ABS) module, the roll stability control (RSC) module, the electronic stability control (ESC) module, or the like; further, the ABS, RSC, and/or ESC systems may have priority over computer 18 with respect to receiving sensor data. That is, in some instances, ABS, RSC, and/or ESC systems may receive sensor data from sensor(s) 38 before the computer 18.

Rotational-rate sensors 40 (e.g., roll, yaw, and pitch sensors) may be any suitable sensor for detecting rotational movement of the vehicle 14 about the X-, Y-, and/or Z-axes. One non-limiting example of a rotational-rate sensor 40 is a gyroscope. Again, a tri-axis gyroscope could be used, or several single-axis gyroscopes may be used. In at least one example, vehicle 14 comprises at least a rotational-rate sensor 40 that measures and/or calculates yaw of vehicle 14. Similar to that discussed above, sensor(s) 40 may be part of the anti-lock braking system (ABS) module, the roll stability control (RSC) module, the electronic stability control (ESC) module, or the like; further (as discussed above), the ABS, RSC, and/or ESC systems may have priority over computer 18 with respect to receiving sensor data. That is, ABS, RSC, and/or ESC systems may receive sensor data from sensor(s) 38 before the computer 18.

Suspension sensors 42 may be any suitable sensor for detecting compression, movement, etc. of a conventional vehicle suspension system. These sensors 42 may be distributed in any suitable manner across the vehicle 14. Sensor data therefrom may include adaptive rise height data, load leveling data, and/or active suspension system data, just to name a few non-limiting examples.

Imaging sensors 44 may comprise one or more sensors which provide autonomous vehicle 14 with situational awareness and facilitate autonomous driving. Non-limiting examples of imaging sensors 44 include laser identification detection and ranging (LIDAR) devices, radio detection and ranging (RADAR) devices, and day cameras (e.g., complementary metal oxide semiconductor (CMOS) devices, charge-coupled devices (CCDs), image intensifiers (so-called i-squared devices), etc.), just to name a few examples. One or more autonomous driving computers (not shown) may have priority with respect to receiving sensor data from sensor(s) 44; e.g., such computers may receive sensor data from sensor(s) 44 before computer 18 does.

Position sensors 46 may comprise one or more suitable electronic devices used to determine position data of vehicle 14, heading data of vehicle 14, and/or roadway data with respect to the position and heading data. Position data may comprise location parameters indicating a geographic location of the vehicle 14. Heading data may comprise a direction and speed in which the vehicle 14 is traveling. And roadway data may pertain to the street, highway, path, etc. upon which vehicle 14 traverses. Roadway data may comprise road condition data—e.g., including whether the roadway is dirt, gravel, asphalt, concrete, inclined or pitched, smooth or bumpy (e.g., according to a scaled measurement), etc. Non-limiting examples of position sensors 46 include a Global Positioning System (GPS) unit and a Global Navigation Satellite System (GLONASS) device. As will be explained below, the position, heading, and roadway data may be used to determine a baseline determination of whether the vehicle 14 is experiencing other influences which might be misconstrued by computer 18 as wheel misalignment.

In at least some examples, vehicle 14 may comprise a wired or wireless network connection 56 which communicatively couples computer 18 to a telematics device 58—e.g., enabling computer 18 to communicate with server 12 via telematics device 58 and communication network 30. Non-limiting examples of network connection 56 include one or more of a controller area network (CAN) bus, Ethernet, Local Interconnect Network (LIN), a fiber optic connection, or the like. Other examples also exist. For example, alternatively or in combination with e.g., a CAN bus, connection 56 could comprise one or more discrete wired or wireless connections.

Telematics device 58, onboard vehicle 14, may be any suitable telematics computing device configured to wirelessly communicate with other electronic devices. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art.

In at least one example, vehicle 14 further comprises a human-machine interface (HMI) module 60. HMI module 60 may include any suitable input and/or output devices such as switches, knobs, controls, etc.—e.g., on an instrument panel, steering wheel, etc. of vehicle 14—which are coupled communicatively to computer 18 (e.g., also via network connection 56). In one non-limiting example, HMI module 60 may comprise an interactive touch screen or display which provides alert or notification information to the users of vehicle 14. As will be explained in greater detail below, notifications may include a reduction of vehicle speed, an instruction to seek an authorized vehicle service personnel regarding wheel misalignment, a notification that the manufacturer or vehicle dealer is being notified of a wheel misalignment, an instruction to proceed to a vehicle service station (or notification to the user that the vehicle 14 is being re-directed to a service station), or the like.

Figure 3:
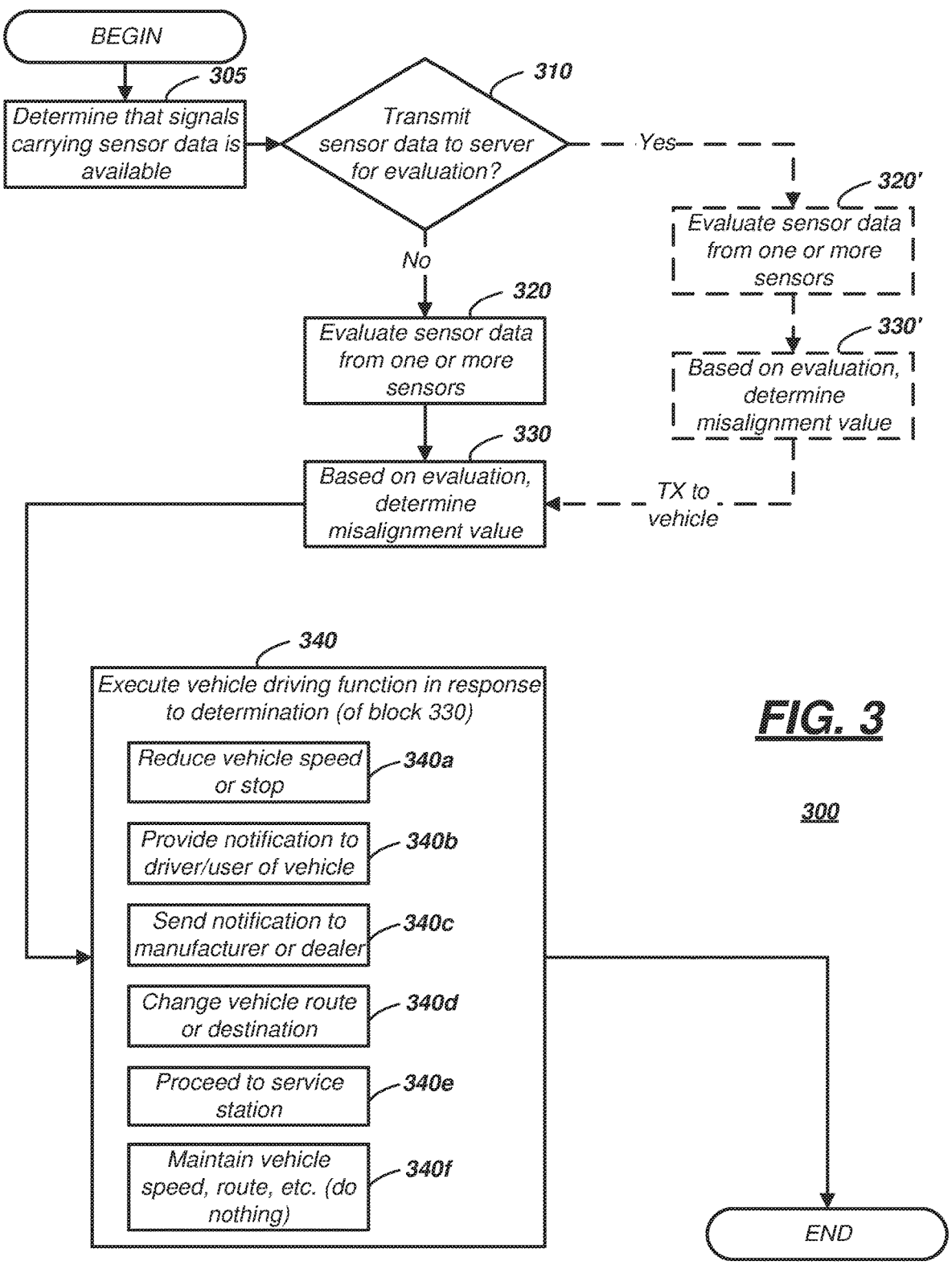
FIGS. 3-5 are flow diagram illustrating various processes which may be executed by the onboard computer.

Turning now to FIG. 3, a process 300 executable by computer 18 is illustrated that includes determining an existence of wheel misalignment in vehicle 14. If wheel misalignment is determined, then computer 18 executes at least one vehicle driving function. The process begins with block 305 which includes computer 18 determining that sensor data is available (e.g., from one or more of sensors 34-46). This instruction may be carried out because a signal carrying sensor data from sensors 34-46 may not always be readily available to computer 18 without disrupting other processes in vehicle 14. For example, anti-lock braking, RSC, or ESC systems may be utilizing the respective signal(s) to maintain vehicle control on a roadway (e.g., while onboard computers are controlling the vehicle 14 in a fully autonomous mode) and permitting the signal(s) to be used (at that time) by computer 18 may disrupt these processes. Consequently, it may be undesirable to disrupt the signal(s) while these or other systems are utilizing it. During periods of low-use or no-use (e.g., by anti-lock braking, RSC, or ESC systems), computer 18 may determine that the signal(s) are available. Thereafter, process 300 proceeds to block 310.

In block 310, computer 18 may determine whether to transmit the sensor data to server 12 for evaluation of wheel misalignment at vehicle 14. According to one example, computer 18 may package a digital file of sensor data (from one or more of sensors 34-46) and transmit it to server 12 via telematics device 58. In this manner, computer 18 may permit the server 12 to perform one or more time-intensive computer-processing computations and determinations, thereby reserving the computing resources of computer 18 for other operations. When in block 310 computer 18 determines to transmit the sensor data to server 12, then process 300 proceeds to block 320'. And when in block 310 computer 18 determines to not export the sensor data to server 12, then process 300 proceeds to block 320.

In block 320, computer 18 evaluates the sensor data from the one or more sensors 34-46. It should be appreciated that the evaluated data may comprise any suitable combination of sensor data from the various sensors 34-46. According to one non-limiting example, computer 18 determines whether a misalignment exists using sensor data from the wheel speed sensor(s) 34, the steering angle and/or torque sensor(s) 36, a rotational-rate (yaw) sensor 40, and one or more acceleration sensors 38 (e.g., including at least y-axis data).

In another instance, computer 18 utilizes sensor data from each of sensors 34-46; and in other instances, other combinations of sensor data from at least some of sensors 34-46 is used.

In block 330 which follows, computer 18 may determine a misalignment value for at least one of wheels 28. Wheel misalignment can be characterized as a matter of degree. Thus, for example, wheel misalignment may be determined when the misalignment value (e.g., for a respective wheel 28) is larger than a first predetermined threshold. However, more severe wheel alignments may be larger than a second predetermined threshold (which second threshold may be larger than the first threshold).

According to one non-limiting example, wheel misalignment values (or ratings) may be normalized by computer 18 to a scale of 1 to 10 (e.g., respectively based on how much the sensor data exceeds the first and/or second thresholds). For example, sensor data which indicates minimal divergence from expected position(s), orientation(s), etc. may be rated a misalignment value of 1, 2, or 3.

Figure 6:
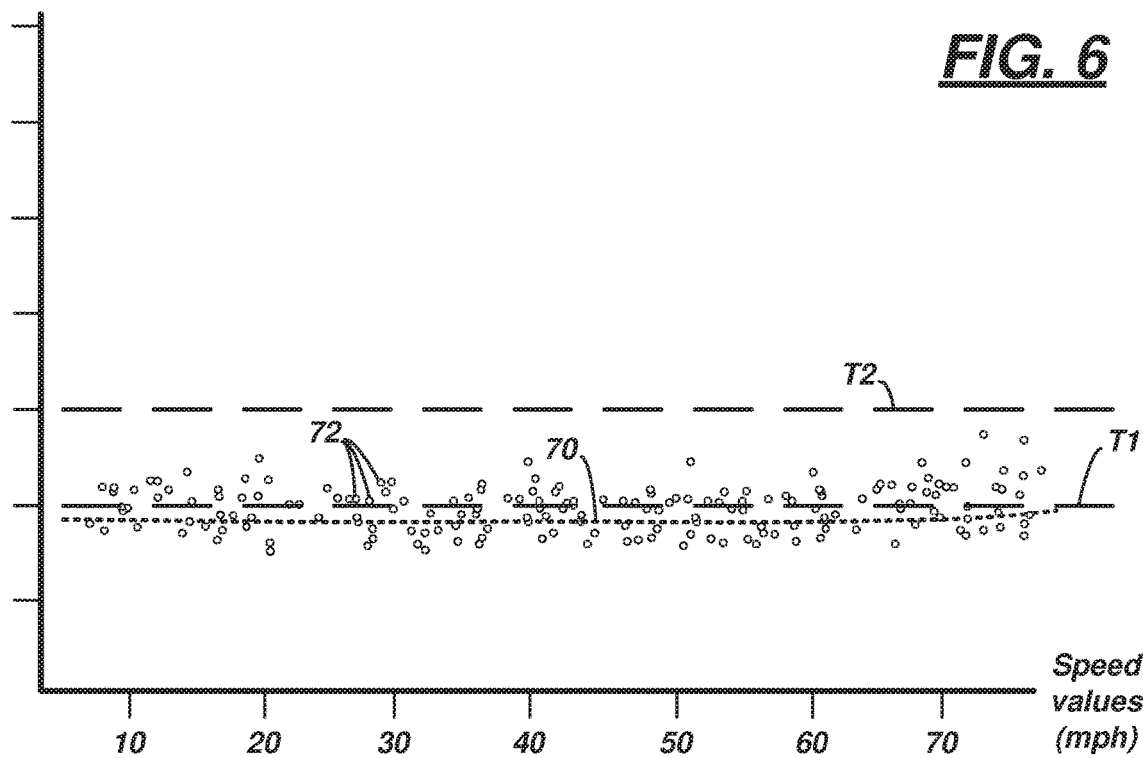

FIG. 6 illustrates an example of a misalignment value of 1, 2, or 3. For example, computer 18 may calculate a trend-line or curve-fit line 70 based on a plurality of data points 72 that comprise calculated error values (e.g., differences between expected values and actual values) and a plurality of corresponding vehicle speed values, each of which correspond to a single error value. When this calculated line 70 falls below both the first predetermined threshold (T1) and the second predetermined threshold (T2), then the error data may be considered nominal, and a misalignment value may be a 1, 2, or 3 (again depending on degree of misalignment). As will be discussed more below, the error data illustrated in FIG. 6 is not sensitive to changes in vehicle speed. (Note: the illustrated data points are not actual or empirical values but are only examples used to illustrate the determination of computer 18.)

Continuing with block 330 example above, slightly greater divergences from one or more expected position(s), orientation(s), etc. may be greater than the first predetermined threshold and may be rated a misalignment value of 4, 5, 6, or 7—these values may indicate a need for vehicle service within the next several thousand miles to avoid excessive tire wear. They may trigger alerts to the user, manufacturer, etc., as discussed below. Similarly, a misalignment value of 8, 9, or 10 (which may be greater than the second predetermined threshold) may indicate a need for more immediate vehicle service. For example, when computer 18 determines a value of 8, 9, or 10, it also may determine to slow or stop the vehicle 14. These misalignment values (as well as the first and second thresholds) will be discussed in greater detail below.

Returning to block 320' (and block 330' which follows it), these blocks may be similar to blocks 320 and 330, respectively—e.g., except that in blocks 320-330, computer 18 in vehicle 14 executes the instructions, whereas in blocks 320'-330', computer 20 of server 12 executes the instructions. Thus, according to one example of block 330, computer 18 determines a misalignment value based on server 12 calculating the value and transmitting the respective value to computer 18 via the network connection 30 and telematics device 58.

Following block 330 (or block 330'), process 300 may proceed to block 340 which may comprise one of the plurality of sub-instructions—illustrated examples including blocks 340a, 340b, 340c, 340d, 340e, 340f. In block 340, in response to the determination of a misalignment value (block 330), computer 18 executes an instruction that includes a vehicle driving function. As used herein, a vehicle driving function pertains to a fully autonomous vehicle operation that controls a direction and/or rotational movement of at least some of the wheels 28. For example, as described below, the vehicle driving function may control speed, direction, route, etc. of the vehicle 14 based on the misalignment value. Further, it may include alerting a user of the vehicle 14 based on a misalignment value. And in some instances, it may include determining to maintain the current direction and/or rotational movement of the vehicle wheels 28—e.g., based on a misalignment value that is less than either of the thresholds.

For example, in block 340a, computer 18 may send instruction to a fully autonomous driving computer (not shown) to reduce vehicle speed or even stop the vehicle 14. In block 340b, computer 18 may determine to maintain the current direction and/or rotational movement of the vehicle wheels 28 but also to provide a visual and/or audible notification to a driver or user of vehicle 14 (e.g., via HMI module 60). In block 340c, computer 18 may determine to maintain the current direction and/or rotational movement of the vehicle wheels 28 but send a notification to a manufacturer of the vehicle 14 or a vehicle dealership—e.g., via telematics device 58. In block 340d, computer 18 may determine to maintain the current direction and/or rotational movement of the vehicle wheels 28 but provide, to an autonomous driving computer onboard vehicle 14, an instruction to change a current vehicle route or destination. In some examples, this instruction could move the vehicle 14 off of a roadway dedicated to high-speed traffic (e.g., a freeway or highway) to a roadway having lower speed limits (e.g., to a side street). For example, computer 18 may determine such slower-traffic roadways using the positioning sensor 46, onboard localization data, etc. In some examples of block 340d, computer 18 may instruct the onboard autonomous driving computer(s) to change destinations—e.g., taking to vehicle 14 to ride-share location, public transportation, etc. (e.g., to assist the user in reaching his or her desired final destination). In block 340e, computer 18 may determine to maintain the current direction and/or rotational movement of the vehicle wheels 28 but provide, to an autonomous driving computer onboard vehicle 14, an instruction to change the vehicle's destination to the nearest vehicle service station so that it may be serviced by an authorized service personnel. And in block 340f, computer 18 may determine to maintain the current direction and/or rotational movement of the vehicle wheels 28 and take no other action—e.g., simply maintaining the vehicle's current speed, route, etc. In this latter instance, computer 18 may take no additional action based on a determination that the calculated misalignment value is below the first or second predetermined thresholds discussed above. Blocks 340a-340f are only examples of sub-instructions of block 340; other examples of also exist. Further, some of blocks 340a-340f may be executed in combination with one another; as an example, blocks 340a could be executed with block 340d or block 340e. Following block 340, process 300 may end.

Figure 4:
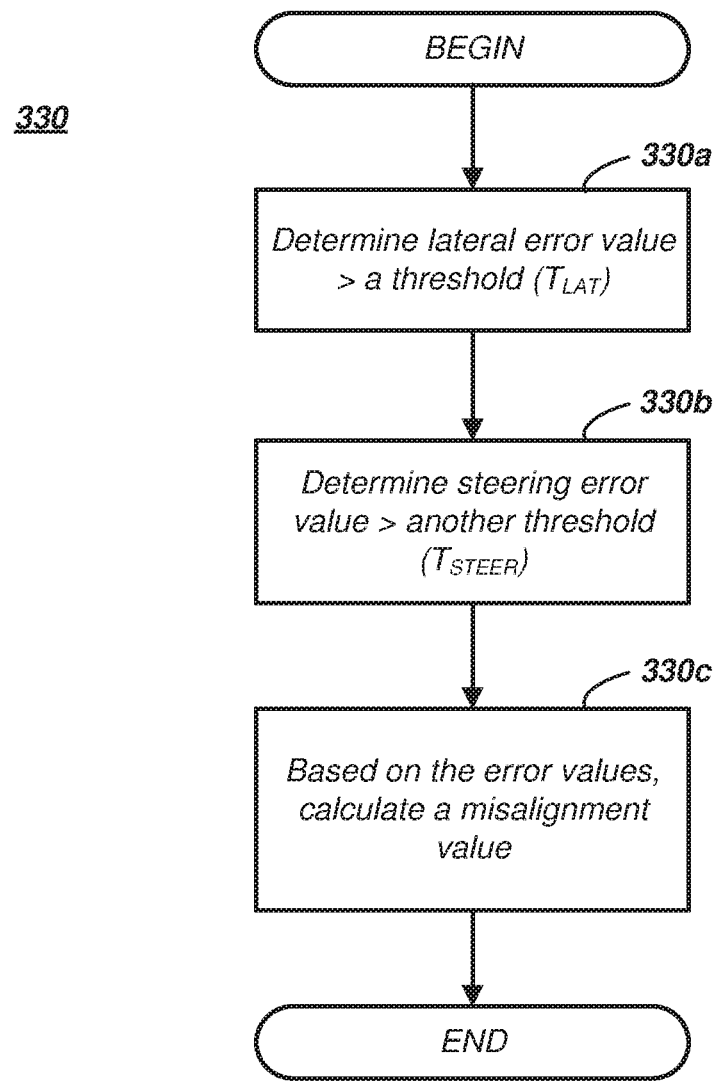

Turning now to FIG. 4, a process executable by computer 18 is illustrated that determines a misalignment value using sensor data from at least two of the sensors 34-46 discussed above. According to one example, the process is one example of a set of sub-instructions of block 330 (of process 300).

The process may begin with block 330a wherein computer 18 may determine that a lateral error value is greater than a threshold ($T_{LAT}$). The lateral error value may be calculated based on a difference between an expected lateral movement of the vehicle 14 and an actual lateral movement of vehicle 14. The actual lateral movement may be received and/or determined via one or more of sensors 38, 40, 44, 46. The expected lateral movement may be determined (and instructed) by an onboard fully autonomous driving computer. For example, when the autonomous driving computer directs the vehicle 14 to drive straight on a roadway but receives feedback from a y-axis accelerometer 38, a yaw-rate sensor 40, an imaging sensor 44, and/or a high-resolution position sensor 46 that is greater than threshold ($T_{LAT}$), then the respective onboard autonomous driving computer may determine such lateral error. In one example, data from each of sensors 38, 40, 44, 46 is averaged; in other examples, sensor data from sensors 44, 46 may be used to confirm or verify a calculated error value that used sensor data from sensors 38, 40; of course, this is merely one example. Computer 18 may compare the lateral error value with threshold ($T_{LAT}$), and block 330a may be completed by computer 18 when the lateral error value is greater than threshold ($T_{LAT}$).

Block 330b may occur following or concurrently with block 330a. Block 330b comprises computer 18 determine a steering error value that is greater than another threshold ($T_{STEER}$). The steering error value may be calculated based on a difference between an expected angular position and/or torque in the steering system of the vehicle 14 and an actual steering angular position and/or torque of vehicle 14. The actual angular position and/or torque may be received and/or determined via one or more angular position and/or torque sensors 36. The expected angular position and/or torque may be determined (and instructed) by an onboard fully autonomous driving computer (e.g., associated with the steering system). For example, when the autonomous driving computer directs the vehicle 14 to drive straight on a roadway but receives feedback that is greater than threshold ($T_{STEER}$) from a steering or chassis sensor 36 measuring steering angle or applied torque, then the respective onboard autonomous driving computer may determine such steering error. Computer 18 may compare one or more steering error values received from the autonomous driving computer with threshold ($T_{STEER}$), and block 330b may be completed by computer 18 when the steering error value is greater than threshold ($T_{STEER}$).

Block 330c occurs in response to computer 18 executing blocks 330a and 330b. For example, based on determining both a lateral error value greater than threshold ($T_{LAT}$) and a steering error value greater than threshold ($T_{STEER}$), computer 18 may calculate a misalignment value. It should be expected that some error is present in typical driving operations; here, this is referred to as nominal lateral error and nominal steering error. As used herein, nominal lateral error and nominal steering error are errors which will result in so-called normal tire life and so-called normal tire wear. According to one non-limiting example, nominal lateral error may be one standard deviation (1σ) from a mean lateral error, and threshold ($T_{LAT}$) may be three standard deviations (3σ) therefrom. Similarly, according to one non-limiting example, nominal steering error may be one standard deviation (1σ) from a mean steering error, and threshold ($T_{STEER}$) may be three standard deviations (3σ) therefrom. Of course, these are merely examples; and other error and threshold quantities may be used.

As discussed above, the misalignment value may be normalized—e.g., having a value between 1 and 10. According to one example of block 330c, if both lateral and steering error are greater than the respective thresholds ($T_{LAT}$, $T_{STEER}$), then the misalignment value may be at least an '8'—e.g., indicating the need for immediate service. For example, as a result of this determination, computer 18 may instruct the vehicle 14 to drive slowly to a vehicle service station or even stop and wait to be towed.

Figure 5:
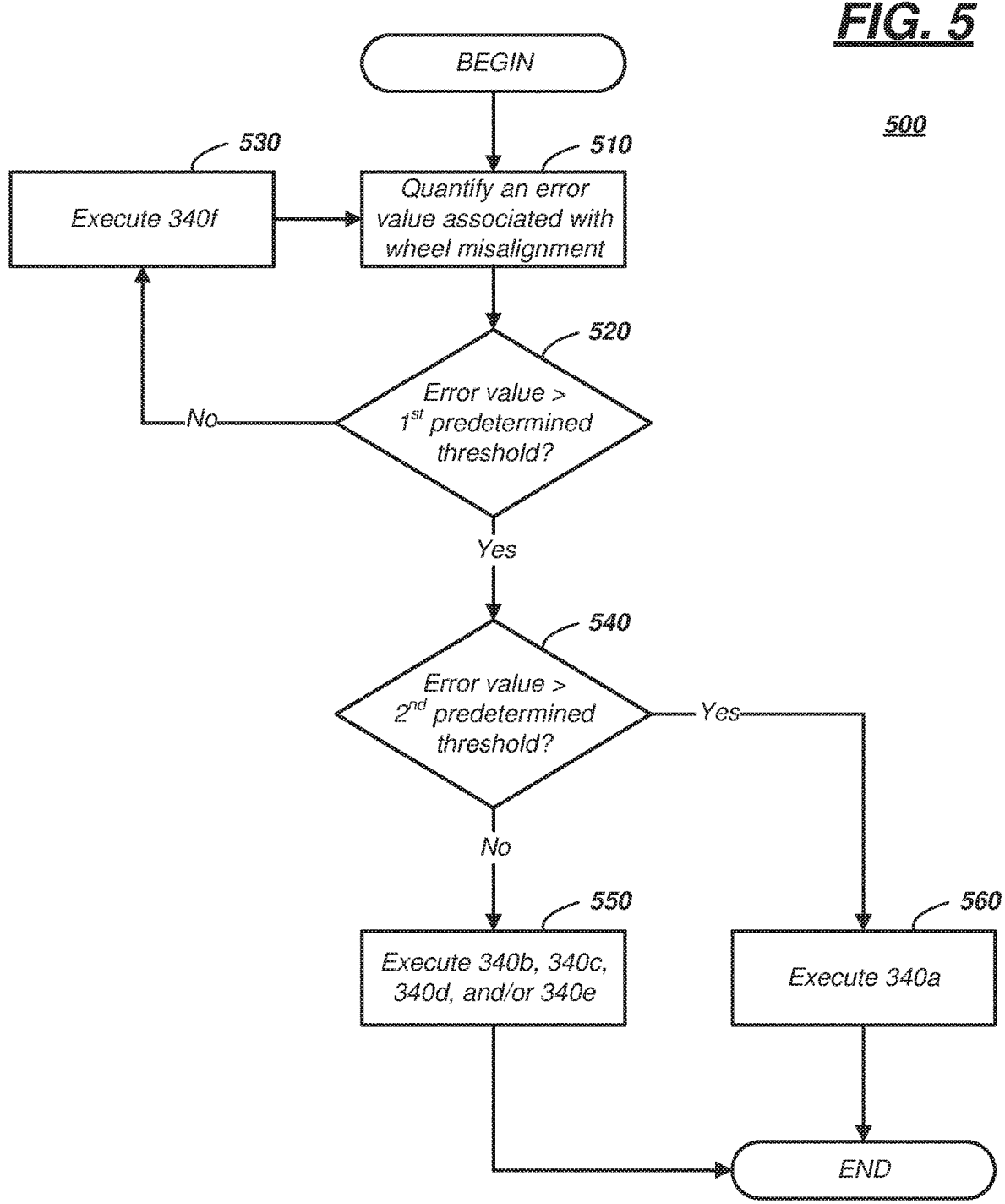

Turning now to FIG. 5, a process 500 executable by process computer 18 is illustrated that includes using a first predetermined threshold (T1) and a second predetermined threshold (T2) (each of error data), and based on these thresholds T1, T2, executing at least one of blocks 340a-340f. Process 500 is described with respect to determining a lateral error value; however, this is merely an example. For instance, instead of using lateral error, computer 18 could use steering error value(s), suspension error value(s), wheel direction error value(s), a combination thereof, or the like. Furthermore, in at least one example, only lateral error values (e.g., from either acceleration sensor(s) 38 or rotational-rate sensor(s) 40) are used to determine a misalignment value (e.g., whether it is normalized or not); in other examples, multiple sensor data is used to determine the error value. According to at least some examples, the error value could be normalized as a misalignment value; however, this is not required.

Process begins with block 510 wherein computer 18 may quantify a lateral error value associated with wheel(s) 28 of vehicle 14. Computer 18 may determine this error value in a manner similar to that discussed above—e.g., by receiving data from acceleration sensor(s) 38, rotational-rate sensor(s) 40, etc., by determining a relative mean of the respective error data, etc.

In block 520 which follows, computer 18 may determine whether the lateral error value is greater than a first predetermined threshold (e.g., a 3σ value from a mean lateral error). If the computer 18 determines the error data exceeds the first predetermined threshold, then the process 500 proceeds to block 540. However, if the error data is not greater than the first predetermined threshold, then the process may proceed to block 530.

In block 530, computer 18 may execute block 340f (of process 300). For example, computer 18 may determine to maintain the current direction and/or rotational movement of the vehicle wheels 28 and take no other action—e.g., maintaining the vehicle's current speed, route, etc. Thereafter, block 530 may loop back to block 510 so that computer 18 may re-execute block 510. This loop may occur repeatedly provided that the vehicle's lateral error value is not greater than the first predetermined threshold.

In block 540 (which may follow block 520 when the lateral error value was greater than the first predetermined threshold), computer 18 may determine the error value exceeds a second predetermined threshold—e.g., which is larger than the first predetermined threshold (e.g., the second predetermined threshold may larger than the first predetermined threshold (e.g., a 4σ or 5σ value of the calculated mean lateral error). When the lateral error value is greater than the first predetermined threshold but less than the second predetermined threshold, then the process may proceed to block 550. And when the error value also exceeds the second predetermined threshold, then process 500 may proceed to block 560.

In block 550, computer 18 may execute one or more non-urgent or non-emergency vehicle driving functions. Non-limiting examples of non-emergency vehicle driving functions include the examples cited above in blocks 340b, 340c, 340d, and/or block 340e. Thereafter, process 500 may end.

In block 560, computer 18 may execute an urgent or emergency vehicle driving function—e.g., such as block 340a. For example, computer 18 may determine to slow or stop the vehicle 14.

Figure 7:
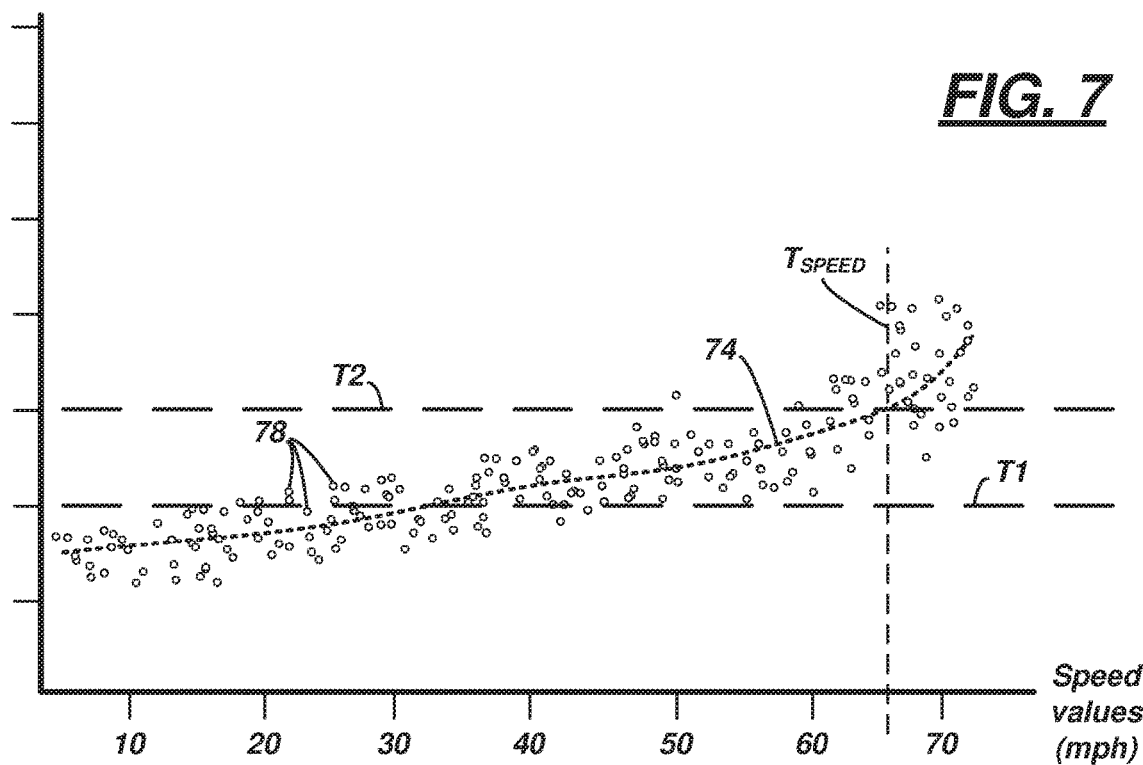

According to one non-limiting example of block 560, computer 18 may make the determination of whether to slow or stop based on a correlation of wheel misalignment (e.g., derived from sensor data from one or more of sensors 36-46) and vehicle speed (e.g., derived from sensor data from wheel speed sensors 34). The diagrams shown in FIGS. 7-8 are illustrative. With respect to the illustrative lateral error discussed in process 500, each of FIGS. 7-8 illustrate the first and second predetermined thresholds T1, T2. Further, each of FIGS. 7-8 illustrate that computer 18 may calculate a trend-line or curve-fit line (74, 76, respectively) based on respective pluralities of data points 78, 80. Similar to FIG. 6, these data points 78 (and 80) are based on a plurality of calculated error values (e.g., differences between expected values and actual values) and a corresponding plurality of vehicle speed values (e.g., each speed value corresponding to a single error value). Again, while lateral errors are discussed with respect to these figures, other types of errors which cause wheel alignment (and which can be correlated to vehicle speed) could also be used to generate trend-lines 74, 76 as well. (Note again: the illustrated data points 78, 80 are not actual or empirical values, but examples used to illustrate the determination of computer 18 in block 560.)

FIG. 7 illustrates an example wherein, as the speed of vehicle 14 increases, trend-line 74 crosses above second threshold T2 (at speed threshold $T_{SPEED}$)—e.g., the misalignment value at speeds greater than threshold $T_{SPEED}$ may be an 8 or 9. Thus, in this example, error increases (e.g., linearly or exponentially) as speed increases. Computer 18 may determine this speed threshold $T_{SPEED}$ by determining when the line 74 crosses the second threshold T2. Accordingly in this example, computer 18 could instruct the vehicle 14 to slow down to speeds less than or equal to the speed threshold $T_{SPEED}$ (e.g., speed threshold $T_{SPEED}$ may be a maximum speed of vehicle 14 operated in the fully autonomous mode). Of course, computer 18 may instruct the vehicle 14 to proceed to an authorized service station as well. Thus, computer 18 may not only determine what vehicle driving function to execute based on a misalignment value, but computer 18 may determine the degree in which to execute said function (e.g., selecting one of a plurality of speeds including zero (0) miles per hour (mph)).

FIG. 8 illustrates another example wherein, the trend-line 76 remains above the second predetermined threshold T2—e.g., the misalignment value may be a 10 regardless of the speed of vehicle 14. This diagram illustrates that the misalignment error is insensitive to vehicle speed. In this instance, the wheel misalignment may be so severe that the vehicle 14 should not be driven; accordingly, computer 18 may instruct the onboard fully autonomous computers to stop and PARK the vehicle 14.

Other examples of system 10 exist as well. For example, in at least one instance, computer 18 is also the above-referenced onboard fully autonomous driving computer.

In another example, the system 10 may compile data and provide a corrective factor based on the make, model, vehicle features or accessories, driving habits, etc. According to one non-limiting example, the correction factor may alter the first and/or second predetermined thresholds—e.g., based on the miles driven, age, etc. of the vehicle 14. Other correction factor examples exist as well.

Thus, there has been described a wheel misalignment sensing system for a vehicle that is operative in a fully autonomous mode. The system includes a vehicle computer which can determine a misalignment value using onboard sensor data. Further, the computer can control the vehicle to perform a vehicle driving function. In some examples, the system further comprises a backend server which is programmed to determine vehicle wheel misalignment and provide a misalignment value back to the vehicle so it may perform the vehicle driving function.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising:
a processor and memory storing instructions executable by the processor, the instructions comprising, to:
receive sensor data from a sensor in a vehicle operating in a fully autonomous mode;
using the data, determine a misalignment value; and
based on the value, perform one of a plurality of vehicle driving functions, wherein the plurality includes:
slowing the vehicle according to a maximum speed threshold based on a first misalignment value,
stopping the vehicle based on a second, larger misalignment value, and
performing a different function based on a third misalignment value that is less than the first misalignment value.

2. The computer of claim 1, wherein the maximum speed threshold is based on a calculated trend-line based on wheel misalignment error values and corresponding vehicle speed values.

3. The computer of claim 1, wherein a trend-line is based on wheel misalignment error values and corresponding speed values which are both larger and smaller than a misalignment error threshold.

4. The computer of claim 3, wherein the misalignment error threshold is larger than three standard deviations of a mean error.

5. The computer of claim 1, wherein the plurality further comprises providing a notification to a user of the vehicle.

6. The computer of claim 1, wherein the plurality further comprises sending a notification to a vehicle manufacturer or dealership.

7. The computer of claim 1, wherein the plurality further comprises driving the vehicle in the mode to a vehicle service station.

8. The computer of claim 1, wherein the plurality further comprises determining to maintain a current direction and/or rotational movement of vehicle wheels in the mode.

9. The computer of claim 1, the instructions further comprising, prior to receiving data, to determine whether a signal carrying the data is currently available.

10. A system, comprising:
the computer of claim 1; and
a server programmed to at least partially determine the misalignment value.

11. A method, comprising:
receiving sensor data from a sensor in a vehicle operating in a fully autonomous mode;
using the data, determining a misalignment value; and
based on the value, performing one of a plurality of vehicle driving functions,
wherein the plurality includes:
slowing the vehicle according to a maximum speed threshold based on a first misalignment value,
stopping the vehicle based on a second, larger misalignment value, and
performing a different function based on a third misalignment value that is less than the first misalignment value.

12. The method of claim 11, wherein the maximum speed threshold is based on a calculated trend-line that comprises wheel misalignment error values and corresponding vehicle speed values.

13. The method of claim 12, wherein the calculated trend-line is based on wheel misalignment error values and corresponding speed values which are both larger and smaller than a misalignment error threshold.

14. The method of claim 11, wherein the plurality further comprises: to provide a notification to a user of the vehicle, to send a notification to a vehicle manufacturer or dealership, to drive the vehicle in the mode to a vehicle service station, or to determine to maintain a current direction and/or rotational movement of vehicle wheels in the mode.

15. A method, comprising:
receiving sensor data from a sensor in a vehicle operating in a fully autonomous mode;

using the data, calculating a trend-line based on wheel misalignment error values and corresponding speed values; and based on the calculation, slowing the vehicle to a maximum speed, the speed corresponding to a threshold misalignment value.

\* \* \* \* \*